United States Patent
Hasegawa et al.

(10) Patent No.: US 6,796,126 B2
(45) Date of Patent: Sep. 28, 2004

(54) SUPERCHARGER

(75) Inventors: Hiroyuki Hasegawa, Shizuoka (JP); Shinya Yoshimoto, Shizuoka (JP); Hiroyuki Itoh, Kanagawa (JP); Satoshi Dairokuno, Kanagawa (JP)

(73) Assignees: HKS Co. Ltd., Fujinomiya (JP); NSK Ltd., Tokyo (JP)

( * ) Notice: Subject to any disclaimer, the term of this patent is extended or adjusted under 35 U.S.C. 154(b) by 0 days.

(21) Appl. No.: 10/320,131

(22) Filed: Dec. 16, 2002

(65) Prior Publication Data

US 2003/0121507 A1 Jul. 3, 2003

(30) Foreign Application Priority Data

Dec. 27, 2001 (JP) ........................................ 2001-398353

(51) Int. Cl.[7] ................................................ F02B 33/44
(52) U.S. Cl. .................... 60/605.1; 123/559.1; 123/561
(58) Field of Search ...................... 60/605.1; 123/559.1, 123/559.2, 559.3, 561

(56) References Cited

U.S. PATENT DOCUMENTS

| | | | |
|---|---|---|---|
| 2,344,078 A | | 3/1944 | Brissonnet et al. |
| 4,249,750 A | * | 2/1981 | Kantner ...................... 280/216 |
| 4,649,307 A | * | 3/1987 | Bech ........................... 310/99 |
| 5,133,325 A | * | 7/1992 | Winkelmann ............. 123/559.3 |
| 5,443,054 A | * | 8/1995 | Tateno et al. ............. 123/559.1 |
| 6,039,668 A | | 3/2000 | Kolstrup |
| 6,231,302 B1 | * | 5/2001 | Bonardi ....................... 415/105 |
| 6,397,808 B1 | | 6/2002 | Tanaka et al. |

FOREIGN PATENT DOCUMENTS

| | | |
|---|---|---|
| JP | 04-203421 | 7/1992 |
| JP | 10-316081 | 12/1998 |
| JP | 11-502596 | 3/1999 |
| JP | 11-294548 | 10/1999 |
| JP | 2001-59459 A | 3/2001 |
| JP | 2001-271897 A | 10/2001 |
| JP | 2002-221263 A | 8/2002 |
| WO | WO 96/30670 A1 | 10/1996 |
| WO | WO 02/064997 A1 | 8/2002 |

* cited by examiner

*Primary Examiner*—Hoang Nguyen
(74) *Attorney, Agent, or Firm*—Frishauf, Holtz, Goodman & Chick, P.C.

(57) ABSTRACT

A speed increasing gear used in a supercharger has a center roller connected to an output shaft, an outer wheel arranged eccentric to the center roller, and a plurality of intermediate rollers arranged within an annular space in which a width of the center roller with respect to a diametrical direction is uneven with respect to a circumferential direction of the center roller. The annular space is provided between the center roller and the outer wheel, and a pivot of at least one intermediate roller is movably arranged in a circumferential direction and a radial direction of the center roller.

20 Claims, 8 Drawing Sheets

SUPERCHARGER

BACKGROUND OF THE INVENTION

1. Field of the Invention

The present invention relates to a supercharger for vehicle engines.

2. Description of the Related Art

Conventionally, there is a supercharger in which a rotation speed of an input shaft is increased by a speed increasing gear so as to be transmitted to an output shaft, and an impeller is provided in the output shaft.

In order to obtain a high speed increasing ratio, Japanese Patent Application Laid-Open No. 4-203421 proposes a structure using a planetary gear mechanism and Japanese Patent Publication No. 11-502596 proposes a structure using a planetary friction roller mechanism, as the speed increasing gear.

In the structure using the planetary gear mechanism described in Japanese Patent Application Laid-Open No. 4-203421, there are problems of gear noise generated by high speed rotation and a reduction in service life of a bearing due to vibration. In order to reduce the problems relating to the noise and the vibration, it is necessary to improve the working accuracy and the assembling accuracy of the gears, resulting in decreased productivity.

In the structure using the planetary friction roller mechanism described in Japanese Patent Publication of No. 11-502596, there are the following problems a to c in view of the structure thereof for fastening a friction roller such as a planetary wheel and a sun shaft by a flexible outer ring.

a. When the rotation becomes high (i.e., at an impeller rotation speed equal to or greater than 75000 rpm), a slip of the friction roller is generated, and it is impossible to transmit a driving force for supercharging to the impeller.

b. In order to prevent slippage at high speed rotation, it is necessary to increase a force by which the outer ring fastens the friction roller. Accordingly, an undesired fastening force is always applied to the friction roller at low speed rotation, and a driving loss at the low speed rotation is great.

c. In order to prevent slippage at high speed rotation and secure a suitable fastening force at low speed rotation, it is necessary to employ an exclusive assembling step of applying a high working accuracy, a selectable fitting, a suitable shrinkage fitting of the outer ring or the like to the outer ring and the friction roller. As a result, the productivity is deteriorated.

SUMMARY OF THE INVENTION

An object of the present invention is to produce a supercharger which does not generate a slip at high speed rotation and a driving loss at low speed rotation, which has low noise and low vibration, which has a light weight and a compact size, and which can be produced at a high productivity.

Another object of the present invention is to improve lubricating and cooling performances of a bearing portion in an output shaft, so as to make it possible to adjust a thrust load and improve durability.

According to the present invention, there is provided a supercharger in which a rotation speed of an input shaft is increased by a speed increasing gear so as to be transmitted to an output shaft, and wherein an impeller is provided in the output shaft.

The speed increasing gear comprises a center roller connected to the output shaft; an outer wheel arranged eccentric to the center roller; and a plurality of intermediate rollers arranged within an annular space in which a width of the center roller with respect to a diametrical direction is uneven with respect to a circumferential direction of the center roller. The annular space is provided between a driven side cylindrical surface corresponding to an outer circumferential surface of the center roller and a drive side cylindrical surface corresponding to an inner circumferential surface of the outer wheel. Respective outer circumferential surfaces of the intermediate rollers are formed as power transmitting cylindrical surfaces.

A pivot of at least one intermediate roller is movably arranged in a circumferential direction and a radial direction of the center roller.

DESCRIPTION OF THE PREFERRED EMBODIMENTS (First Embodiment)(FIG. 1 to FIG. 4)

Figure 1:
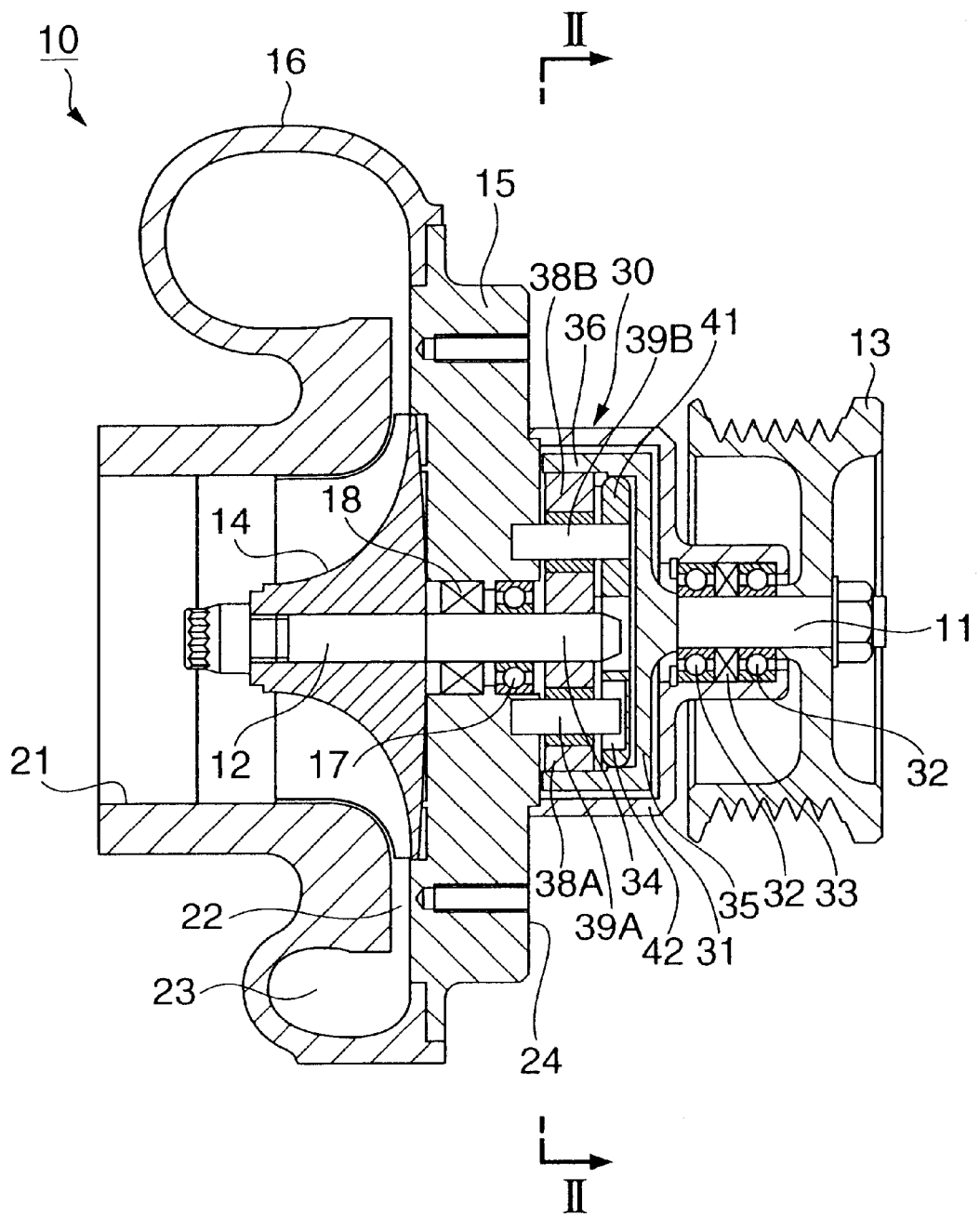
FIG. 1 is a cross sectional view which shows a supercharger according to a first embodiment.
Figure 2:
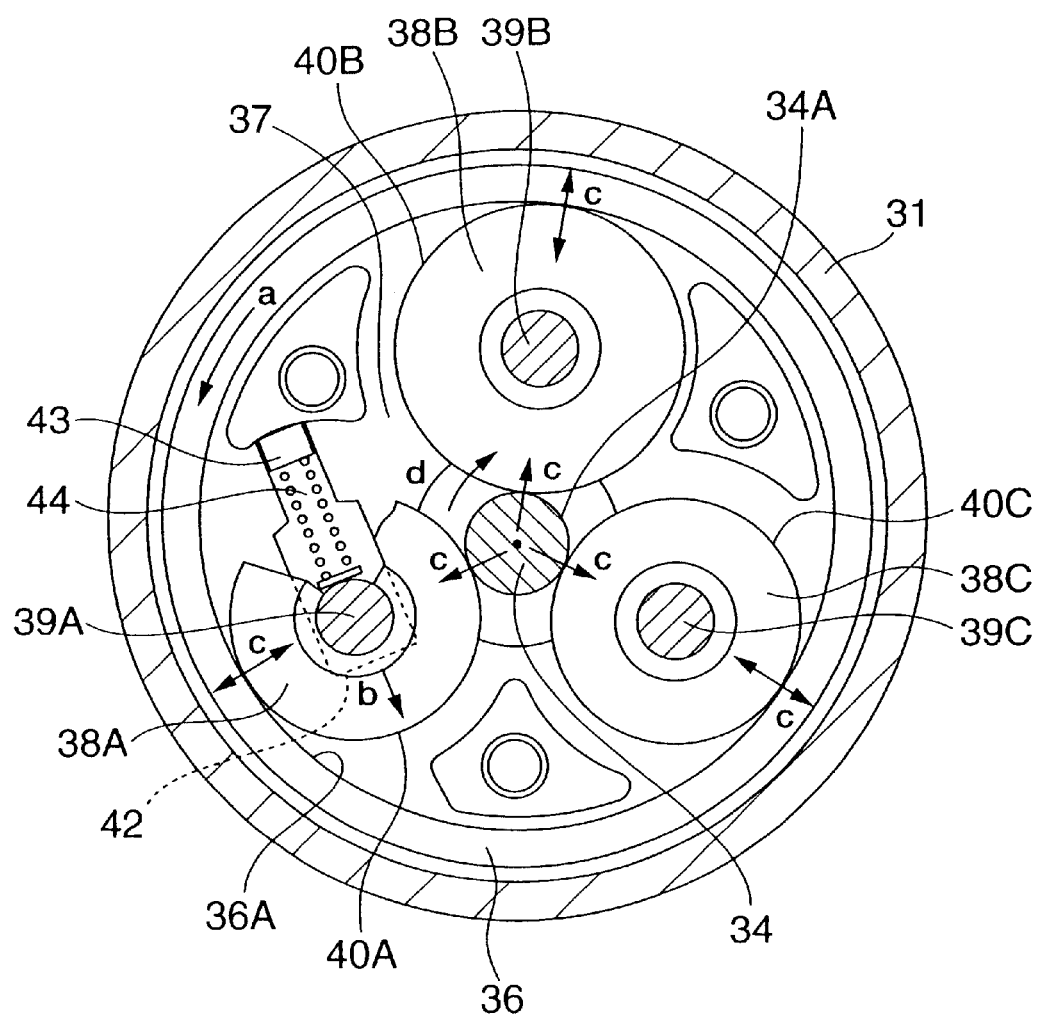
FIG. 2 is an end elevational view along a line II—II in FIG. 1.

An automotive supercharger 10 in FIG. 1 comprises an input shaft 11, a speed increasing gear 30 that transmits increased rotation to an output shaft 12, a pulley 13 driven by an engine output and fixed to the input shaft 11, and an impeller 14 provided in the output shaft 12.

The supercharger 10 is structured such that a compressor housing 16 is fixed to a center plate 15. The center plate 15 supports the output shaft 12 by a bearing 17. Reference numeral 18 denotes an oil seal. The compressor housing 16 receives the impeller 14, and is provided with a suction port 21, a supercharging passage 22 and a scroll 23.

The speed increasing gear 30 is a friction roller type speed increasing gear utilizing a wedge effect, and is provided with a speed increasing housing 31 in such a manner as to be fixed to the center plate 15, and the speed increasing housing 31 supports the input shaft 11 by a bearing 32. Reference numeral 33 denotes an oil seal.

The speed increasing gear 30 is provided with a center roller 34 integrally and concentrically arranged in an end portion of the output shaft 12, in an inner portion of the speed increasing housing 31.

The speed increasing gear 30 is provided with an outer wheel 36 integrally and concentrically arranged in an end portion of the input shaft 11 via a disc portion 35, in the inner portion of the speed increasing housing 31. An outer wheel 36 is arranged eccentric to the center roller 34.

In the speed increasing gear 30, three intermediate rollers 38A to 38C are arranged within an annular space 37 in which a width of the center roller 34 with respect to a radial direction is uneven with respect to a circumferential direction of the center roller 34 due to the eccentricity between the center roller 34 and the outer wheel 36. The annular space 37 is provided between a driven side cylindrical surface 34A corresponding to an outer circumferential surface of the center roller 34 and a drive side cylindrical surface 36A corresponding to an inner circumferential surface of the outer wheel 36, in the inner portion of the speed increasing housing 31. The end portions of three pivots 39A to 39C are respectively supported on the center plate 15 and a connection plate 41. The connection plate 41 is fixed to the center plate 15 by connection bolts 41A (FIG. 4) and is received at a position in the inner portion of the speed increasing housing 31 and along the disc portion 35. The intermediate rollers 38A to 38C are rotatably supported by the pivots 39A to 39C, respectively. The respective pivots 39A to 39C are arranged parallel to the center roller 34 and a center axis of the outer wheel 36. In the respective intermediate rollers 38A to 38C, outer circumferential surfaces thereof are formed as power transmitting cylindrical surfaces 40A to 40C which roll in contact with the driven side cylindrical surface 34A of the center roller 34 and the drive side cylindrical surface 36A of the outer wheel 36.

Two of the pivots 39B and 39C are fixed by pressing or inserting both end portions thereof into supporting holes provided in the center plate 15 and the connection plate 41 with no play. Accordingly, the pivots 39B and 39C do not displace in a circumferential direction and a radial direction of the center roller 34 in the inner portion of the speed increasing housing 31.

On the other hand, the pivot 39A is structured such that both end portions thereof can freely displace in the circumferential direction and the radial direction of the center roller 34 within the center plate 15 and a guide groove 42 provided in the connection plate 41, and the intermediate roller 38A is formed as a movable roller. The pivot 39A is pressed by a spring 44 corresponding to a pressing means which is backed up by a spring receiver 43 provided in the center plate 15 or the connection plate 41, and presses the movable roller 38A corresponding to the intermediate roller to the center roller 34 and the outer wheel 36 in a direction in which a width of the annular space 37 becomes narrow.

Accordingly, in the speed increasing gear 30, when the supercharger 10 is mounted to the engine by using a mounting boss 24 provided in the center plate 15, and a driving force is input to an input pulley 13 from the engine, the driving force is transmitted to the outer wheel 36 from the input shaft 11. At this time, since the outer wheel 36 and the center roller 34 are eccentric as mentioned above and the annular space 37 mentioned above is uneven with respect to the circumferential direction of the center roller 34, the movable roller 38A moves in a direction b in which the movable roller 38A is exposed to the wedge effect between the outer wheel 36 and the center roller 34 according to a rotation of the outer wheel 36 in a direction a, so that a pressing force c is generated among the driven side cylindrical surface 34A of the center roller 34, the drive side cylindrical surface 36A of the outer wheel 36 and the power transmitting cylindrical surfaces 40A to 40C of the intermediate rollers 38A to 38C. On the basis of the pressing force c, a friction force is generated among the driven side cylindrical surface 34A of the center roller 34, the drive side cylindrical surface 36A of the outer wheel 36 and the power transmitting cylindrical surfaces 40A to 40C of the intermediate rollers 38A to 38C. The driving force transmitted to the outer wheel 36 is transmitted to the center roller 34, and the center roller 34 rotates in a direction d. The rotation of the center roller 34 generates a rotation of the integrally formed output shaft 12. The impeller 14 fixed to the output shaft rotates, and air is sucked from the suction port 21. This air is supercharged so as to be supplied to the engine from a chamber pipe communicated with the scroll 23.

In this case, since three intermediate rollers 38A to 38C are substantially uniformly arranged peripheral to the center roller 34, substantially the same pressing force as the pressing force generated in the movable roller 38A corresponding to one of the intermediate rollers is also generated in the guide rollers 38B and 38C corresponding to the other intermediate rollers, and the power is transmitted by the three intermediate rollers 38A to 38C.

When the driving force transmitted to the outer wheel 36 from the input shaft 11 is changed to a reverse direction to the rotational direction a due to a speed reduction of the engine, the movable roller 38A displaces in an opposite direction to the direction b, a connection between the drive side cylindrical surface 36A of the outer wheel 36 and the power transmitting cylindrical surface 40A of the movable roller 38A is shut off, and a power transmission between the outer wheel 36 and the movable roller 38A is shut off.

Figure 3:
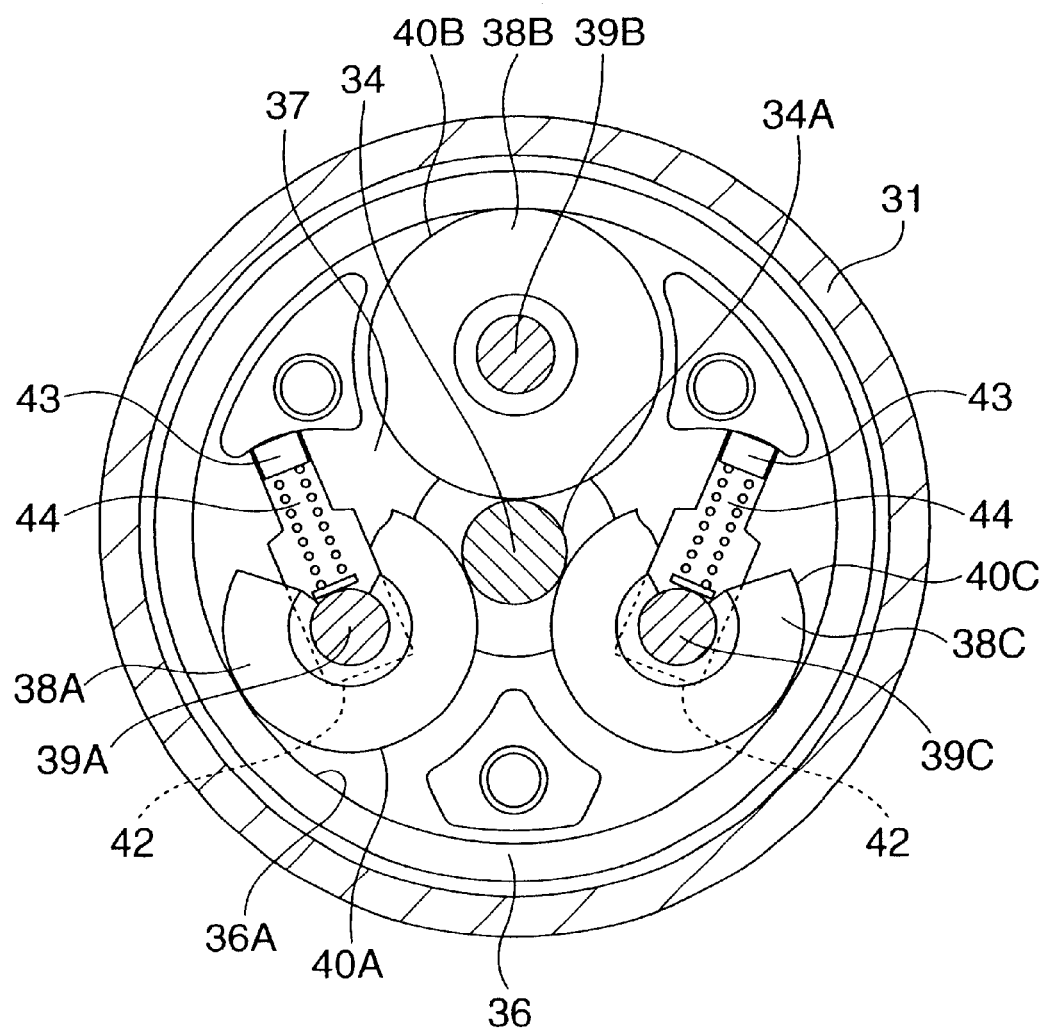
FIG. 3 is an end elevational view which shows a modified embodiment of a speed increasing machine.

In order to perform power transmission without relation to the direction of the driving force input to the outer wheel 36 from the input shaft 11, the intermediate roller 38C is formed as the movable roller in the same manner as the intermediate roller 38A, and the movable rollers 38A and 38C are structured such as to be opposed to each other with respect to the narrow portion of the annular space 37 so as to be pressed displaceably within the guide grooves 42 by attached springs 44 and 44, as shown in FIG. 3. A stopper (not shown) for preventing the movable roller 38C (or 38A) on the opposite side to the movable roller 38A (or 38C) generating the wedge effect from escaping in a direction coming off from the wedge may be attached to the pivots 39A and 39C of the movable roller 38A and 38C.

In the case that it is desired to limit a maximum transmission torque from the input shaft 11 to the output shaft 12, a distance at which the movable roller 38A can displace in the direction b is regulated by a length of the guide groove 42. Accordingly, when the outer wheel 36 rotates in the direction a, it is possible to limit the pressing force c which is generated by the wedge effect applied to the movable roller 38A between the movable roller 38A and the center roller 34. In the case shown in FIG. 3 that the power transmission is performed without relation to the direction of the driving force input to the outer wheel 36, it is possible to achieve limiting in the same manner. It is thus possible to limit a supercharging pressure and an air volume which the supercharger 10 can supply.

A description will be given below of a lubricating and cooling structure of the speed increasing gear 30.

Traction oil is sealed in the annular space 37 of the speed increasing gear 30, and the traction oil lubricates and cools portions such as the driven side cylindrical surface 34A of the center roller 34, the drive side cylindrical surface 36A of the outer wheel 36, the power transmitting cylindrical surfaces 40A to 40C of the intermediate rollers 38A to 38C, the bearing 17 of the output shaft 12 and the like. In this case, the traction oil may be forcibly circulated to these portions by an oil pump provided in an inner portion or an outer portion of the speed increasing gear 30.

Figure 4:
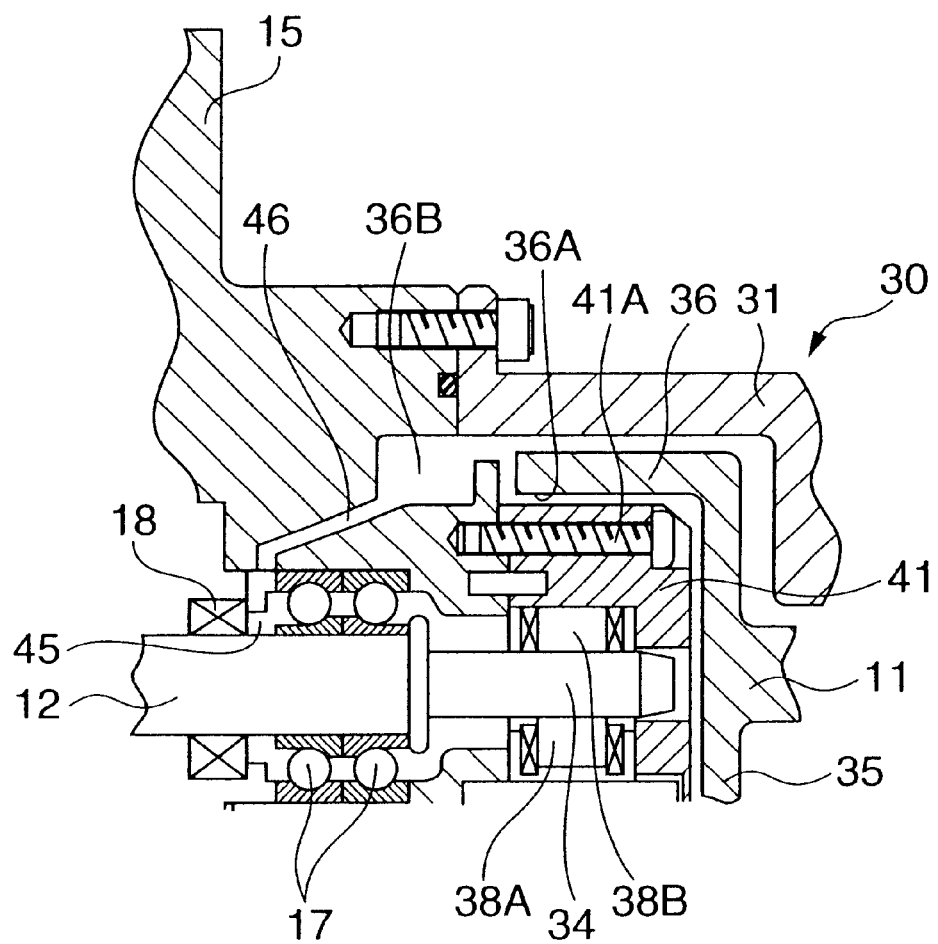
FIG. 4 is a cross sectional view which shows an oil circulating path.

In the speed increasing gear 30, as shown in FIG. 4, an oil passage 46 communicating an outer circumferential portion of a space within the speed increasing gear 30 with a space 45 held between the bearing 17 and the oil seal 18 can be pierced in the center plate 15, and the traction oil around the drive side cylindrical surface 36A of the outer wheel 36 near an inner wall of the speed increasing housing 31 thrown up based on the rotation of the speed increasing gear 30 can be received by an oil receiving portion 36B. The traction oil can be introduced to the bearing 17 from the oil passage 46 through the oil receiving portion 36B, and the traction oil can then flow out to the driven side cylindrical surface 34A of the center roller 34. The traction oil can be further guided to the power transmitting cylindrical surfaces 40A to 40C of the intermediate rollers 38A to 38C, and the traction oil can be circulated to portions to be lubricated such as the driven side cylindrical surface 34A of the center roller 34, the drive side cylindrical surface 36A of the outer wheel 36, the power transmitting cylindrical surfaces 40A to 40C of the intermediate rollers 38A to 38C, the bearing 17 of the output shaft 12 and the like.

In this case, when the traction oil sufficiently exists within the speed increasing gear 30, it can be expected that the traction oil is circulated based on a pressure difference caused by a centrifugal force of the rotation.

According to the present embodiment, the following effects can be obtained.

(1) Since the friction roller type speed increasing gear 30 utilizing the wedge effect is employed as the speed increasing gear 30 which increases the rotation speed of the input shaft 11 so as to transmit increased rotation to the output shaft 12 provided with the impeller 14, a pressing force in proportion to a transmission torque can be obtained between contact surfaces of the outer wheel 36, the intermediate rollers 38A to 38C and the center roller 34, thereby preventing slippage at high speed rotation and driving loss at low speed rotation. Therefore, a high transmission efficiency can be obtained both at a low load and low rotation speed and at a high load and high rotation speed. Accordingly, it is possible to restrict the supercharger driving loss of the engine (which has been a problem in the conventional automotive supercharger).

(2) In comparison with the conventional friction roller mechanism product, a high working accuracy, a selective fitting and an exclusive assembling step such as shrinkage fitting or the like are not required, and productivity is increased.

(3) Since the present invention provides a friction roller mechanism employing no gears, it is possible to reduce noise and vibration.

(4) Since it is possible to transmit the driving force with a high transmission efficiency, it is possible to reduce the axial lengths of the intermediate rollers 38A to 38C and the center roller 34. Accordingly, in comparison with the structure employing a conventional existing friction roller mechanism or planetary gear mechanism, it is possible to reduce a total length of the supercharger 10 and it is possible to achieve a light weight and a compact size.

(5) Since the circulating path such as the oil passage 46 of the traction oil and the oil storage portion and the like for lubricating and cooling the bearing 17 of the output shaft 12 and the contact surfaces among the outer wheel 36, the intermediate rollers 38A to 38C and the center roller 34 is provided in the inner portion of the supercharger 10, it is possible to utilize the throw-up of oil due to rotation of the speed increasing gear 30, as well as a pressure difference due to centrifugal force and gravity. Thus, it is possible to improve the lubricating performance of the traction oil, and it is possible to maintain the bearing 17 and the contact surfaces in a well lubricated state.

Figure 5:
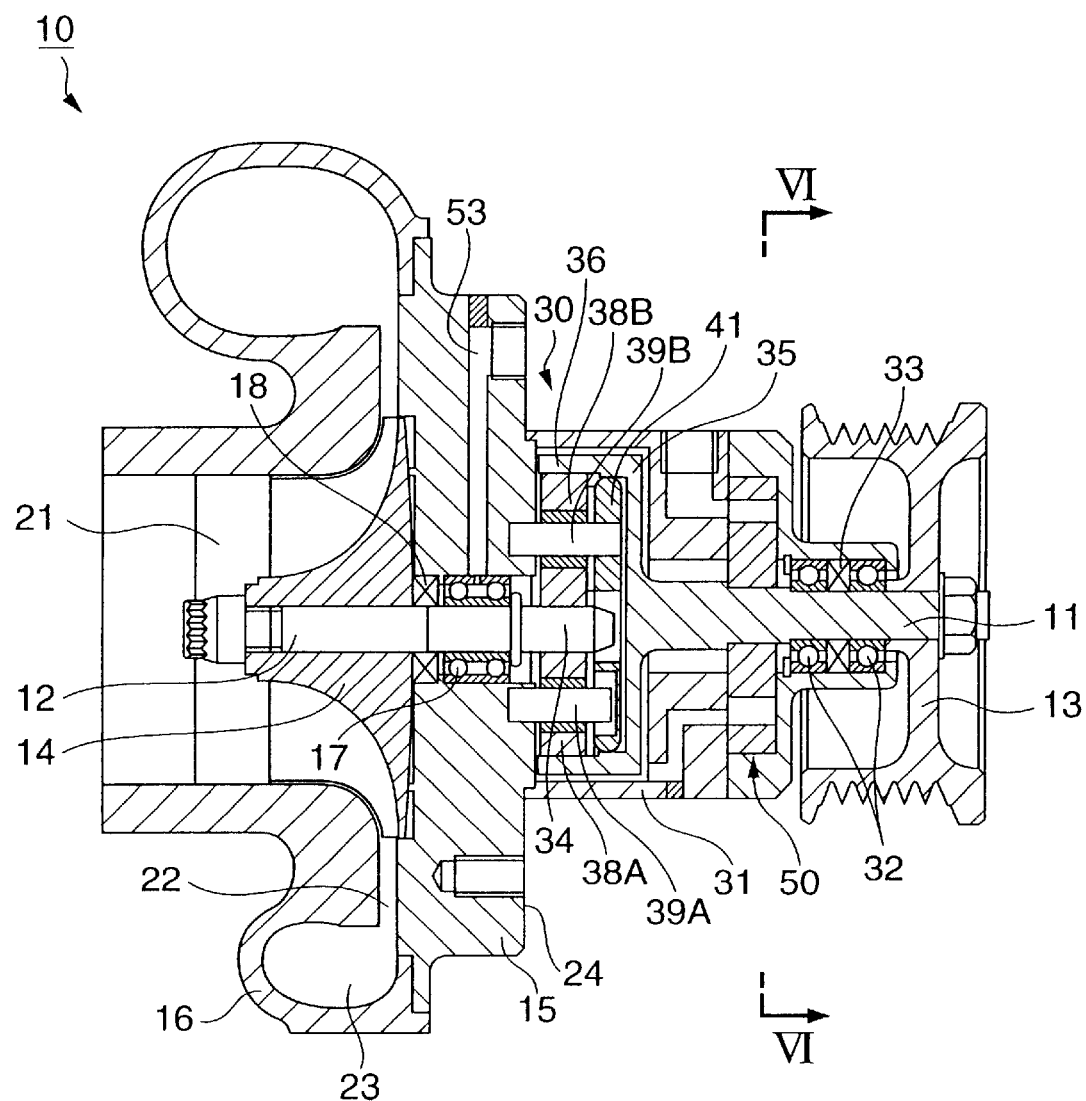
FIG. 5 is a cross sectional view which shows a supercharger according to a second embodiment.
Figure 6:
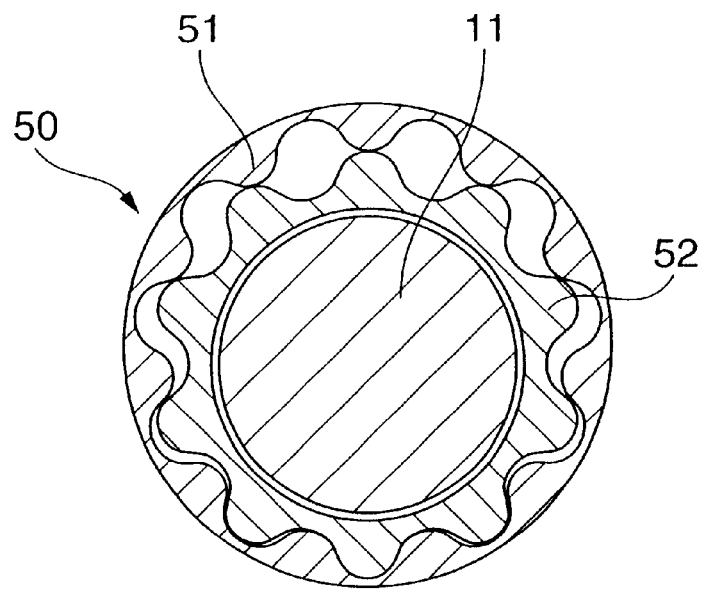
FIG. 6 is a cross sectional view along a line VI—VI in FIG. 5.
Figure 7:
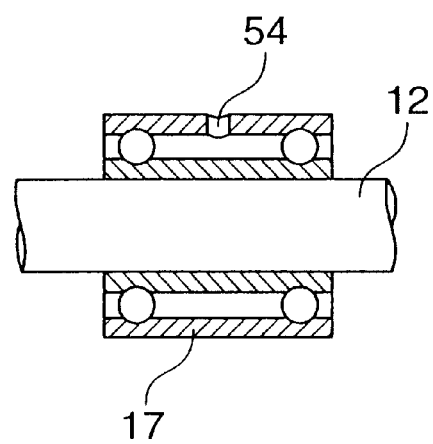
FIG. 7 is a cross sectional view which shows a bearing portion.

(Second Embodiment)(FIG. 5 to FIG. 7)

A supercharger 10 according to a second embodiment is different from the supercharger 10 according to the first embodiment in that the speed increasing gear 30 is provided with a built-in trochoidal oil pump 50 for circulating the traction oil in the inner portion of the speed increasing gear 30.

As shown in FIG. 5 and FIG. 6, the oil pump 50 comprises an outer rotor 51 assembled in the speed increasing housing 31, and an inner rotor 52 spline connected to the input shaft 11. The oil pump 50 circulates the traction oil sealed in the speed increasing housing 31 to an external portion so as to cool, and again introduces the traction oil into the inner portion of the speed increasing housing 31, whereby it is possible to lubricate and cool the driven side cylindrical surface 34A of the center roller 34, the drive side cylindrical surface 36A of the outer wheel 36, and the power transmitting cylindrical surfaces 40A to 40C of the intermediate rollers 38A to 38C.

Further, the oil pump 50 can supply the circulating traction oil to the bearing 17 of the output shaft 12 from an oil passage 53 provided in the center plate 15 via an oil feeding pipe (not shown) through an oil hole 54, and can flow out the oil to the driven side cylindrical surface 34A of the center roller 34, and the power transmitting cylindrical surfaces 40A to 40C of the intermediate rollers 38A to 38C.

According to the present embodiment, the oil pump 50 for lubricating and cooling the bearing 17 of the output shaft 12 and the contact surfaces among the outer wheel 36, the intermediate rollers 38A to 38C and the center roller 34 is provided in the inner portion of the supercharger 10. Therefore, there is no need that the oil pump 50 is arranged in the outer portion of the supercharger 10 as in the conventional case, and it is possible to achieve a compact structure.

Figure 8:
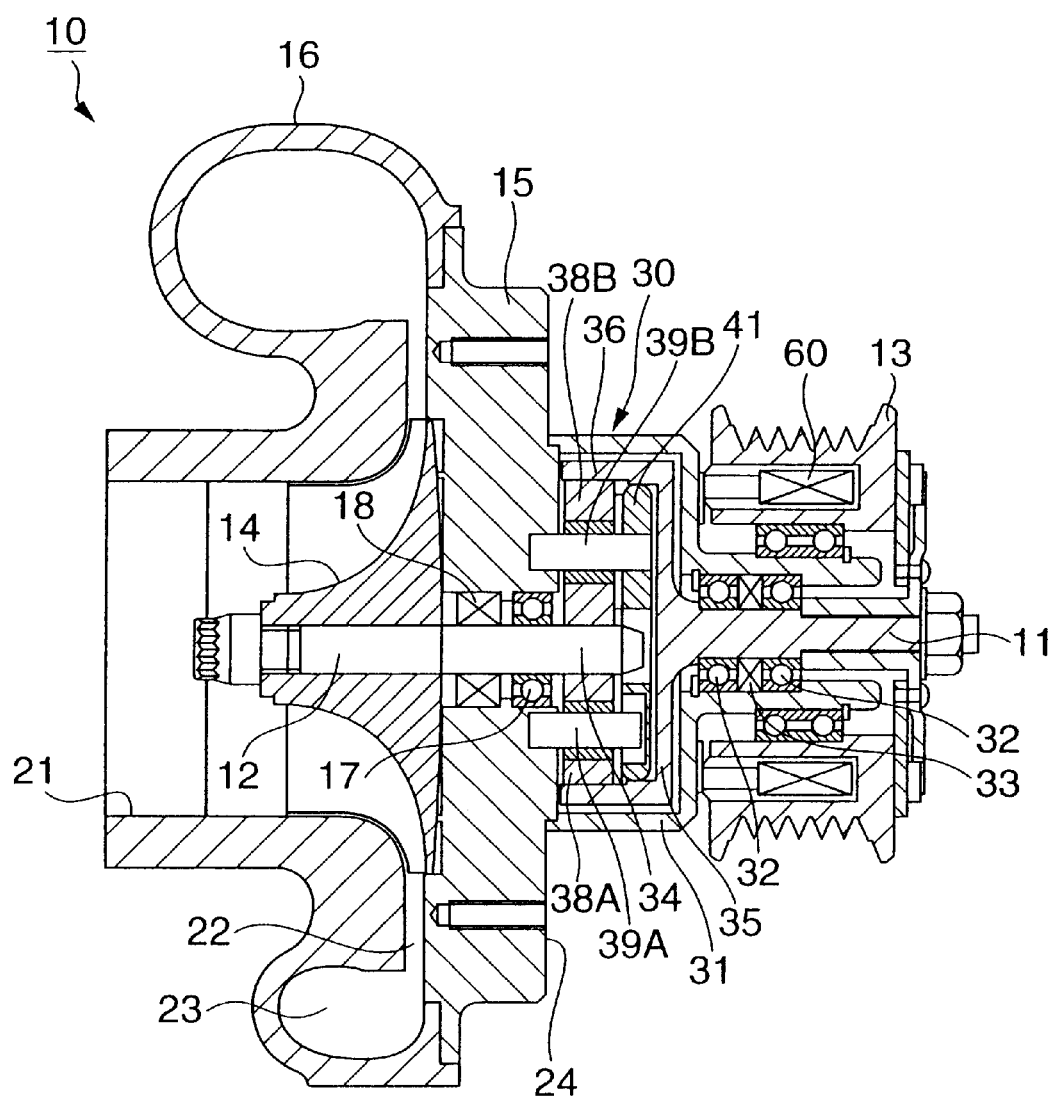
FIG. 8 is a cross sectional view which shows a supercharger according to a third embodiment.

(Third Embodiment)(FIG. 8)

A supercharger 10 according to a third embodiment is different from the superchargers 10 according to the first embodiment and the second embodiment in that an electromagnetic clutch 60 is provided between the input shaft 11 and the pulley 13, and the electromagnetic clutch 60 can be controlled to be turned on and off in correspondence with whether or not supercharging by the supercharger 10 is required. The electromagnetic clutch 60 can employ a disc type clutch, a powder clutch and the like.

According to the present embodiment, since an inertia force of a rotation body in the inner portion of the speed increasing gear 30 and the driving loss are small, the electromagnetic clutch 60 can employ a structure having a small capacity. Accordingly, even in the case that the electromagnetic clutch 60 is mounted, the supercharger can be easily mounted to the engine in comparison with conventional mechanical superchargers.

Figure 9:
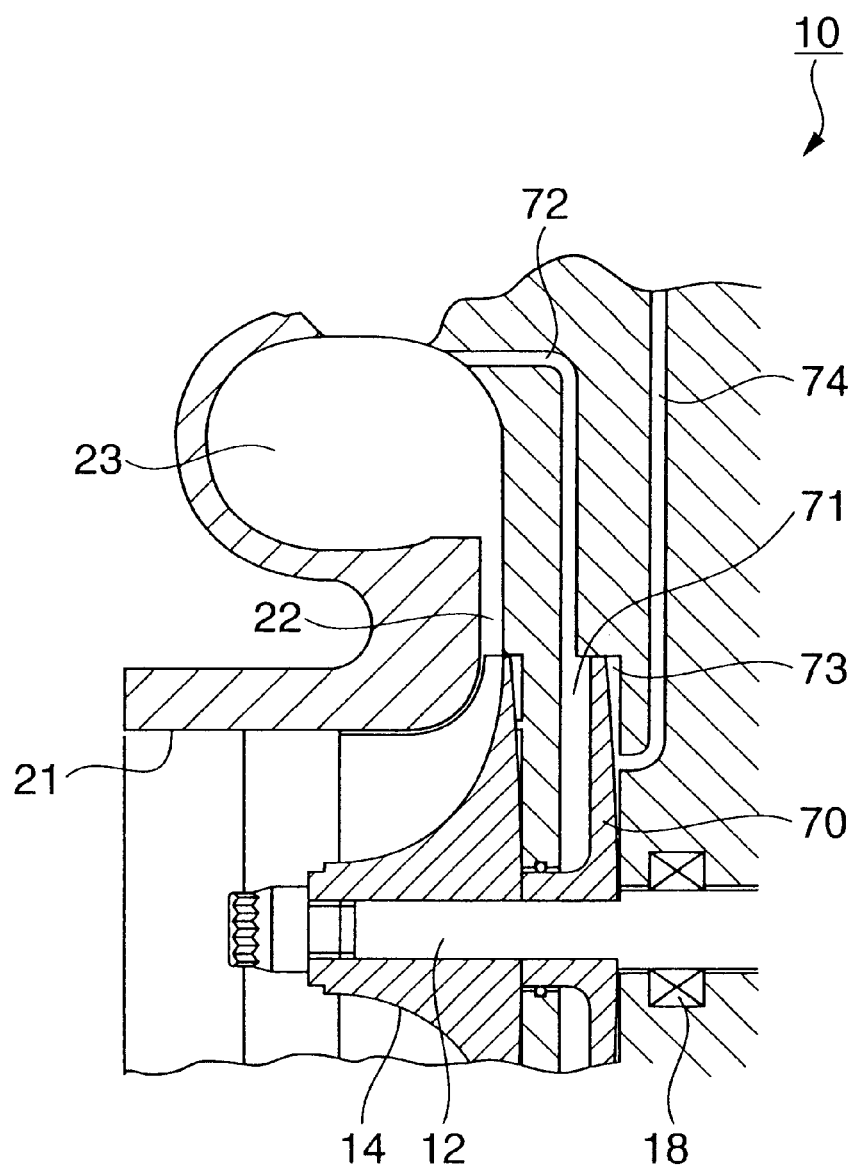
FIG. 9 is an enlarged cross sectional view of a main portion which shows a supercharger according to a fourth embodiment.

(Fourth Embodiment)(FIG. 9)

A supercharger 10 according to a fourth embodiment is different from the superchargers 10 according to the first embodiment, second embodiment and third embodiment in that a balance plate 70 is provided in the output shaft 12. A supercharging pressure is introduced into a space 71 in one side of the balance plate 70 from the scroll 23 via a passage 72. A suction pressure (or an atmospheric pressure from an atmospheric space) is introduced into a space 73 in another side of the balance plate 70 from a suction port 71 via a passage 74. Pressures in both of the spaces 71 and 73 applied to the balance plate 70 balance a thrust load applied to the impeller 14, and reduce a thrust load applied to the bearing 17 of the output shaft 12.

According to the present embodiment, since the balance plate 70 is provided in the output shaft 12, the supercharging pressure is applied to one side of the balance plate 70, and the suction pressure or the atmospheric pressure is applied to another side of the balance plate 70, it is possible to adjust the thrust load applied to the output shaft 12 of the supercharger 10, and it is possible to reduce the thrust load applied to the bearing 17 of the output shaft 12, and to improve durability.

As heretofore explained, embodiments of the present invention have been described in detail with reference to the drawings. However, the specific configurations of the present invention are not limited to the embodiments and modifications of the design within the range of the present invention are also included in the present invention.

As mentioned above, according to the present invention, it is possible to produce a light and compact supercharger which does not generate slippage at high speed rotation and driving loss at low speed rotation, which has low noise and low vibration, and which can be produced at a high productivity.

Further, according to the present invention, it is possible to improve the lubricating and cooling performance of bearing portions in the output shaft, and to adjust the thrust load, and improve durability.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as being limited to the specific embodiments described above, and should be understood to include all possible embodiments which can be embodied within the scope of the appended claims and equivalents thereof.

What is claimed is:

1. A supercharger in which a rotation speed of an input shaft is increased by a speed increasing gear so as to be transmitted to an output shaft, and an impeller is provided in the output shaft, wherein the speed increasing gear comprises:

a center roller connected to the output shaft;

an outer wheel arranged eccentric to the center roller; and a plurality of intermediate rollers arranged within an annular space in which a width of the center roller with respect to a diametrical direction is uneven with respect to a circumferential direction of the center roller, wherein said annular space is provided between a driven side cylindrical surface corresponding to an outer circumferential surface of the center roller and a drive side cylindrical surface corresponding to an inner circumferential surface of the outer wheel, wherein respective outer circumferential surfaces of said intermediate rollers are formed as power transmitting cylindrical surfaces, and wherein a pivot of at least one of said intermediate rollers is movably arranged in a circumferential direction and a radial direction of the center roller.

2. A supercharger as claimed in claim 1, further comprising a circulation path for circulating traction oil in an inner portion of the speed increasing gear to portions to be lubricated, based on rotation of the speed increasing gear.

3. A supercharger as claimed in claim 1, wherein the speed increasing gear comprises a built-in oil pump for circulating traction oil in an inner portion of the speed increasing gear.

4. A supercharger as claimed in claim 2, wherein the speed increasing gear comprises a built-in oil pump for circulating the traction oil in the inner portion of the speed increasing gear.

5. A supercharger as claimed in claim 1, wherein a balance plate is provided in the output shaft, a supercharging pressure is applied to a first side of the balance plate, and at least one of a suction pressure and an atmospheric pressure is applied to a second side of the balance plate.

6. A supercharger as claimed in claim 2, wherein a balance plate is provided in the output shaft, a supercharging pressure is applied to a first side of the balance plate, and at least one of a suction pressure and an atmospheric pressure is applied to a second side of the balance plate.

7. A supercharger as claimed in claim 3, wherein a balance plate is provided in the output shaft, a supercharging pressure is applied to a first side of the balance plate, and at least one of a suction pressure and an atmospheric pressure is applied to a second side of the balance plate.

8. A supercharger as claimed in claim 4, wherein a balance plate is provided in the output shaft, a supercharging pressure is applied to a first side of the balance plate, and at least one of a suction pressure and an atmospheric pressure is applied to a second side of the balance plate.

9. A supercharger as claimed in claim 1, wherein an input pulley is connectable to the input shaft, and an electromagnetic clutch is provided between the input pulley and the input shaft.

10. A supercharger as claimed in claim 2, wherein an input pulley is connectable to the input shaft, and an electromagnetic clutch is provided between the input pulley and the input shaft.

11. A supercharger as claimed in claim 3, wherein an input pulley is connectable to the input shaft, and an electromagnetic clutch is provided between the input pulley and the input shaft.

12. A supercharger as claimed in claim 4, wherein an input pulley is connectable to the input shaft, and an electromagnetic clutch is provided between the input pulley and the input shaft.

13. A supercharger as claimed in claim 5, wherein an input pulley is connectable to the input shaft, and an electromagnetic clutch is provided between the input pulley and the input shaft.

14. A supercharger as claimed in claim 6, wherein an input pulley is connectable to the input shaft, and an electromagnetic clutch is provided between the input pulley and the input shaft.

15. A supercharger as claimed in claim 7, wherein an input pulley is connectable to the input shaft, and an electromagnetic clutch is provided between the input pulley and the input shaft.

16. A supercharger as claimed in claim 8, wherein an input pulley is connectable to the input shaft, and an electromagnetic clutch is provided between the input pulley and the input shaft.

17. A supercharger as claimed in claim 1, wherein the plurality of intermediate rollers are arranged peripheral to the center roller with a uniform interval.

18. A supercharger as claimed in claim 1, wherein said pivot of said at least one of said intermediate rollers is freely displaceable within a guide groove, and a displaceable distance of said intermediate roller is regulated by the guide groove.

19. A supercharger as claimed in claim 3, wherein the oil pump supplies the traction oil to a bearing of the output shaft.

20. A supercharger as claimed in claim 4, wherein the oil pump is a trochoidal pump.

* * * * *